United States Patent [19]

Anderson

[11] Patent Number: 4,489,827
[45] Date of Patent: Dec. 25, 1984

[54] MECHANICAL SPLICING APPARATUS AND METHOD

[75] Inventor: William B. Anderson, Oconomowoc, Wis.

[73] Assignee: Rexnord Inc., Brookfield, Wis.

[21] Appl. No.: 519,470

[22] Filed: Aug. 1, 1983

Related U.S. Application Data

[63] Continuation of Ser. No. 263,628, May 14, 1981, abandoned.

[51] Int. Cl.³ .............................................. B65G 15/30
[52] U.S. Cl. .......................................... 198/844; 24/37
[58] Field of Search .................. 198/844, 846, 847; 474/256, 257; 24/31 R, 34, 36, 37, 38; 384/234, 275

[56] References Cited

U.S. PATENT DOCUMENTS

| 275,896 | 4/1883 | Eibee | 24/37 |
|---|---|---|---|
| 1,543,559 | 6/1925 | Donnelly | 24/37 |
| 2,446,311 | 8/1948 | Traxler | 474/257 |
| 3,748,698 | 7/1973 | Lachmann | 24/38 |
| 4,056,867 | 11/1977 | Wert et al. | 24/37 |
| 4,161,059 | 7/1979 | Francois | 474/257 X |

FOREIGN PATENT DOCUMENTS

| 2231322 | 1/1974 | Fed. Rep. of Germany | 24/37 |
|---|---|---|---|
| 2341992 | 3/1975 | Fed. Rep. of Germany | 24/37 |
| 267 | of 1853 | United Kingdom | 24/37 |
| 21078 | of 1899 | United Kingdom | 24/37 |
| 24685 | of 1903 | United Kingdom | 24/37 |
| 260868 | 11/1926 | United Kingdom | 24/37 |
| 322536 | 12/1929 | United Kingdom | 24/37 |

Primary Examiner—Robert J. Spar
Assistant Examiner—Jonathan D. Holmes

[57] ABSTRACT

The present invention provides a splice for high tension belts in which the ends of the belt are curved at about right angles to the belt. Plates are placed on the outside of the two belt ends, spacer bushings are placed between the plates and through apertures in the belt ends, bolts are placed through holes in the two plates and through the spacer bushings, and the bolts are tightened, causing the plates to press against the spacer bushings. The bolts are pretensioned by tightening them to a predetermined tension which is higher than the tension experienced during operation.

1 Claim, 7 Drawing Figures

MECHANICAL SPLICING APPARATUS AND METHOD

This application is a continuation of application Ser. No. 263,628, filed May 14, 1981, now abandoned.

BACKGROUND OF THE INVENTION

This invention relates to splices for belts and, more particularly, to mechanical splices for high tension belts.

Several types of splices have been used in the past for splicing the ends of belts which are used in high tension applications such as in bucket elevators. Some belt manufacturers suggest that the ends of the belt be lapped over each other and bolted together with several bolts. The bolts are expected to take the shear stress which occurs when the ends of the belt try to slide parallel to each other due to the tension on the belt. This type of splice has been found to be unsatisfactory in some bucket elevator applications, because, when a bucket is bolted onto the spliced area of the belt, the bolts holding the bucket on tend to fail. The failure is probably due to the relative movement of the two lapped belt ends in the splice which take unequal loads when passing over the pulley.

In other splices, the ends of the belt have been curved at approximately right angles to the rest of the belt. Plates are put on the outside of the belt ends, and the plates are bolted together, clamping the belt ends between the plates. With this kind of a splice, instead of strictly a shear force on the bolts, a large portion of the force on the bolts is a tension force, in a direction perpendicular to the plates, caused when the ends of the belt try to pull apart. The remainder of the force is in a direction parallel to the plates, again trying to shear the bolts. In these arrangements, part of the force parallel to the plates is handled by friction of the plates clamping the belts, and in some cases the inside of the plates is roughened or toothed to help grip the belts. This arrangement avoids the problem of buckets falling off, because the buckets no longer are bolted through an area in which there is a double thickness of belts. However, this splice tends to fail due to fatigue failure of the bolts, because the tension on the bolts repeatedly changes as buckets are loaded and dumped, as the splice passes over pulleys, and so forth. The bolts in this arrangement cannot be pretensioned to a high tension, due to the "give" in the belting material.

A main object of the present invention is to provide a splice for high tension belts which lasts longer than the splices which are presently available. Another object of the present invention is to provide a splice for high tension belts in which the bolts holding the splice together can be pretensioned, so that repeatedly changing the loading on the belts does not tend to cause fatigue in the bolts holding the splice together. Another object of the present invention is to provide a belt splice which avoids the problems involved in attaching buckets through two thicknesses of belts.

SUMMARY OF THE INVENTION

The present invention provides a splice for high tension belts in which the ends of the belt are curved at about right angles to the belt. Plates are placed on the outside of the two belt ends, spacer bushings are placed between the plates and through apertures in the belt ends, bolts are placed through holes in the two plates and through the spacer bushings, and the bolts are tightened, causing the plates to press against the spacer bushings. The bolts are pretensioned by tightening them to a predetermined tension which is higher than the tension experienced during operation.

DESCRIPTION OF THE PREFERRED EMBODIMENT

Figure 1:
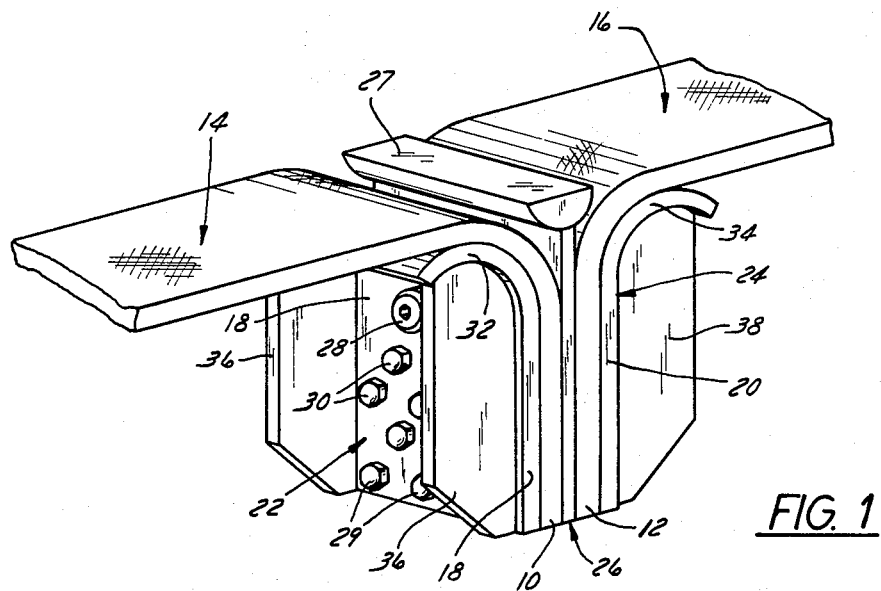
FIG. 1 is a perspective of an assembled splice made in accordance with the present invention.

FIG. 1 is a perspective of an assembled splice. It can be seen that the ends 10, 12 of belts 14, 16 are placed between the flat portions 18, 20 of first outer plate 22 and second outer plate 24. Inner plate 26 is located between belt ends 10, 12 and between outer plates 22, 24. Inner plate 26 includes rounded end 27. Belts 14, 16 are generally driven over a pulley, and the function of rounded end 27 is to tend to prevent a wing-type of pulley from getting wedged between belts 14, 16 in the area of the splice. Rounded end 27 also serves to provide a smooth transition area so that, when the spliced area passes over a pulley, there tends not to be as much impact on the belt as there would be if rounded end 27 were not present. Bolts 28 and pins 30 have been inserted through holes in plates 22, 24 and 26 and through belt ends 10, 12. The belts 14, 16 curve around curved portions 32, 34 of outer plates 22, 24 and leave plates 22, 24 at approximately right angles to flat portions 18, 20. Braces 36 are welded to curved portion 32 and to flat portion 18 in order to stiffen outer plate 22. Similarly, braces 38 are welded to curved portion 34 and to flat portion 20 in order to stiffen outer plate 24.

Figure 2:
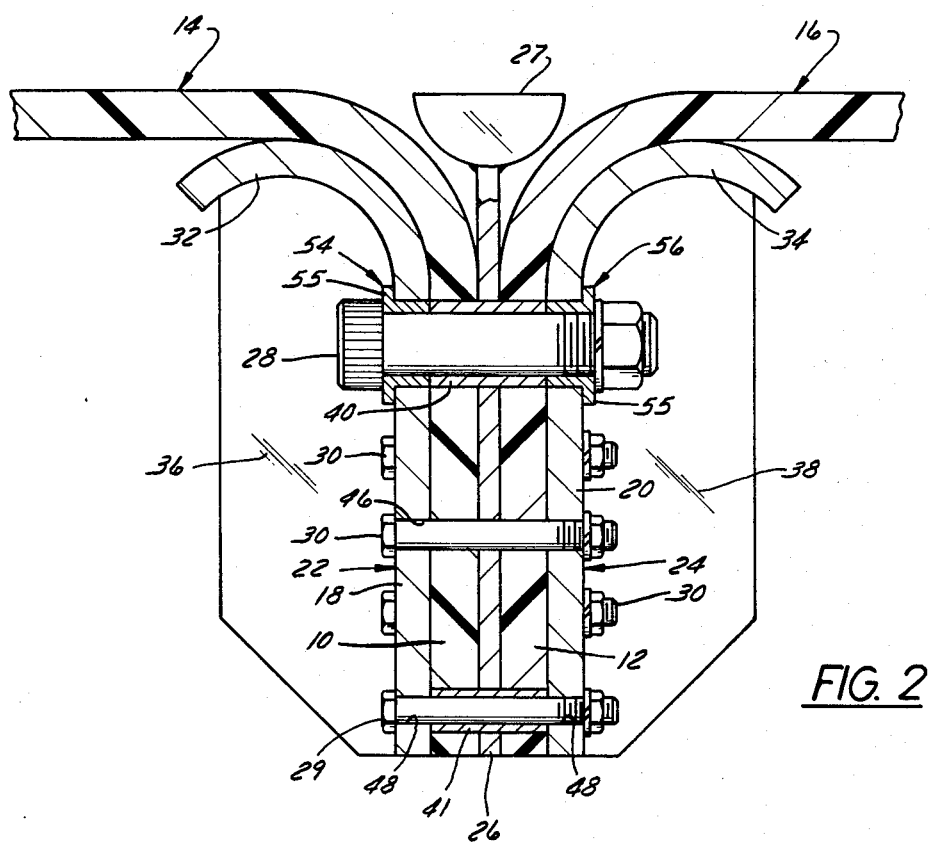
FIG. 2 is a side cross-sectional view of the assembled splice shown in FIG. 1.

FIG. 2 is a side cross-sectional view of the assembled splice of FIG. 1. Curved portions 32, 34 and rounded end 27 can be seen more clearly in this view. It should be noted that curved portions 32, 34 permit a gradual change in direction of belts 14, 16 to approximately right angles to flat portions 18, 20. It is thought that a radius of curvature of greater than two inches is preferable for belt bucket elevator applications.

The mechanism by which the splice is held together can be seen in FIG. 2. Large bolt 28 passes through flanged bushing 54 in outer plate 22, through holes in belt end 10, inner plate 26, and belt end 12, and through flanged bushing 56 in outer plate 24. Spacer bushing 40 is mounted through inner plate 26 and its ends abut flanged bushings 54, 56 in outer plates 22 and 24. Spacer bushing 40 may be made of hardened steel, so that it can take a large compression load with a small outside diameter. Bolt 28 is tightened so that flanged bushings 54, 56 press against spacer bushing 40 with a predetermined force, thereby pretensioning bolt 28. If flanged bushings 54, 56 are not used, the holes in outer plates 22, 24 through which large bolt 28 passes will be of small enough diameter to permit the outer plates 22, 24 to press directly against the ends of spacer bushing 40. Bolt 28 is located close to the end of flat portions 18, 20 which is nearest curved portions 32, 34. A smaller diameter bolt 29 is located near the end of the outer plates 22, 24 farthest from curved portions 32, 34. Bolt 29 passes through spacer bushing 41 and is also pretensioned. Pins 30 are located behind bolt 28 and pass through holes in outer plates 22, 24, inner plate 26 and belt ends 10, 12.

As shown in FIG. 2, pins 30 are actually small diameter bolts, but they are referred to as pins, because their primary function is to resist shear force, as will be described later. Since their primary function is to resist shear force, it is thought that nails, rivets, pins and other types of fastening devices could be successfully used in their place.

The way in which this splice holds belts 14, 16 together is as follows:

There is a tension force on belts 14, 16 which tends to pull them apart. Much of that force is transferred to plates 22, 24 by belt ends 10, 12 and tends to separate plates 22, 24. The main function of bolts 28 is to resist the tension force trying to separate plates 22, 24. Because bolts 28 are pretensioned, as explained earlier, they can resist changing tension forces without fatiguing. Bolts 28 may be pretensioned to a higher tension than would ordinarily be experienced during operation in order to avoid problems with fatigue. Belt ends 10, 12 also tend to slide parallel to and pull out of flat portions 18, 20 due to the tension on belts 14, 16. The main function of pins 30 is to secure belt ends 10, 12 to plates 22, 24 in such a manner so as to prevent belt ends 10, 12 from sliding out from between flat portions 18, 20. Pins 30 are thus subject to shear forces. Since bolts 28 take the tension force, pins 30 should not be required to withstand much tension. Any tendency of plates 22, 24 to move together on the end farthest away from curved portions 32, 34 may be counteracted by spacer bushing 41 on bolt 29.

Figure 3:
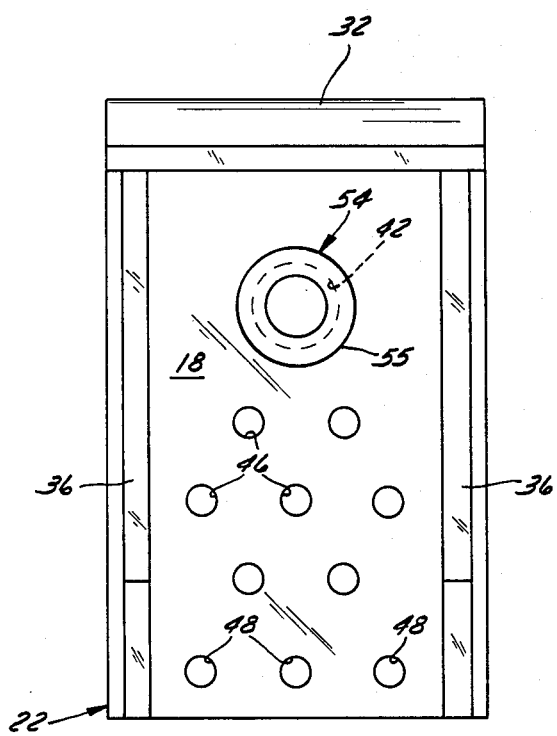
FIG. 3 is a top view of outer plate 22 shown in FIG. 1.
Figure 5:
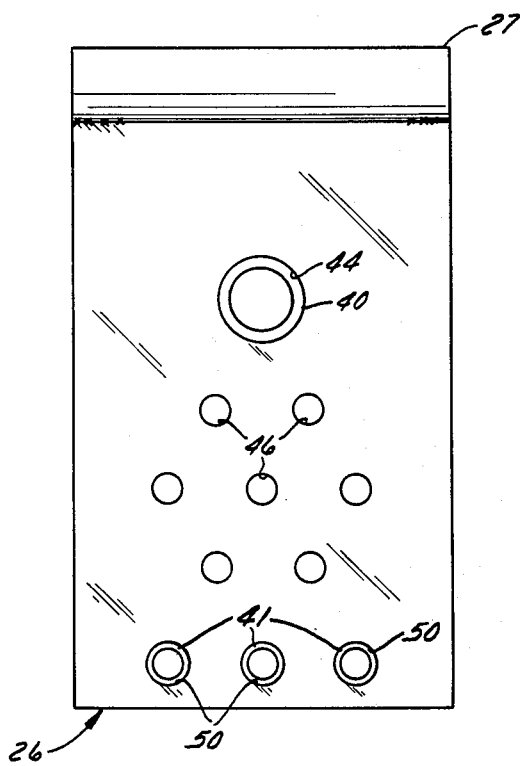
FIG. 5 is a top view of inner plate 26 shown in FIG. 1.

FIG. 3 is a top view of first outer plate 22, which is identical to outer plate 24. FIG. 5 is a top view of inner plate 26. These two figures illustrate the arrangement of holes in the plates. It can be seen that the holes in outer plate 22 correspond to the holes in inner plate 26. Large diameter hole 42 in outer plate 22 is closest to curved portion 32. Flanged bushing 54 is press fit into large diameter hole 42 and is adapted to receive bolt 28. Flanged bushing 54 has a flange 55 larger than the bolt head diameter and serves to reduce the bearing pressure on the softer outer plate 22 so as to prevent distortion of outer plate 22 which could cause loss of bolt pretension. Large diameter hole 44 in inner plate 26 corresponds to hole 42 in outer plate 22. Spacer bushing 40 is press fit into hole 44. Smaller holes 46 in both plates 22, 26 are adapted to receive pins 30. The arrangement of smaller holes 46 may be made to correspond to the bolt arrangement used to hold the buckets onto the belt so that, when the belt stretches, the splice may be moved to a different portion of the belt, and the holes in the belt which were originally used to hold on a bucket can be reused in the splice. Holes 48 in outer plate 22 correspond to holes 50 in inner plate 26, with holes 50 having a larger diameter than holes 48 in order that they may receive bushings 41. Other hole arrangements would also be possible within the scope of this invention. It is important, however, to keep the area of the holes as small as possible so as to leave as much belt material as possible to withstand the forces on belt ends 10, 12.

Figure 4:
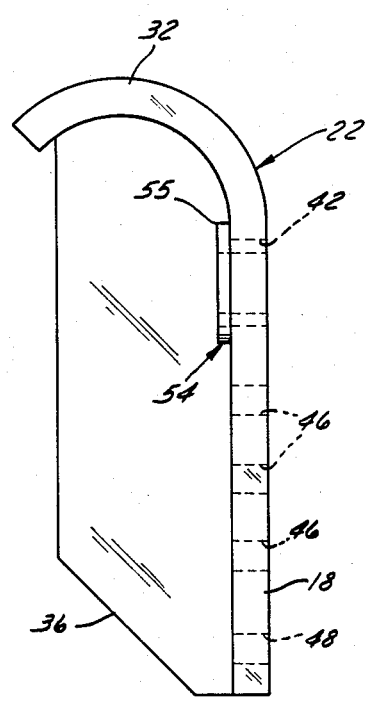
FIG. 4 is a side view of outer plate 22 shown in FIG. 1.

FIG. 4 is a side view of outer plate 22 which is identical to outer plate 24. It can be seen in this view that holes 42, 46, 48 pass entirely through flat portion 18. This view also shows flanged bushing 54, which is press fit in place.

Figure 6:
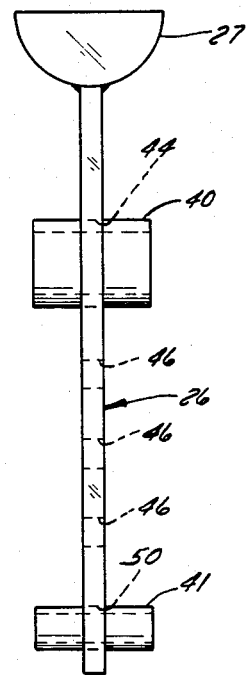
FIG. 6 is a side view of inner plate 26 shown in FIG. 1

FIG. 6 is a side view of inner plate 26, showing spacer bushings 40, 41 which have been press fit in place prior to assembly of the splice, as well as showing the cup-shaped cross-section of rounded end 27.

Figure 7:
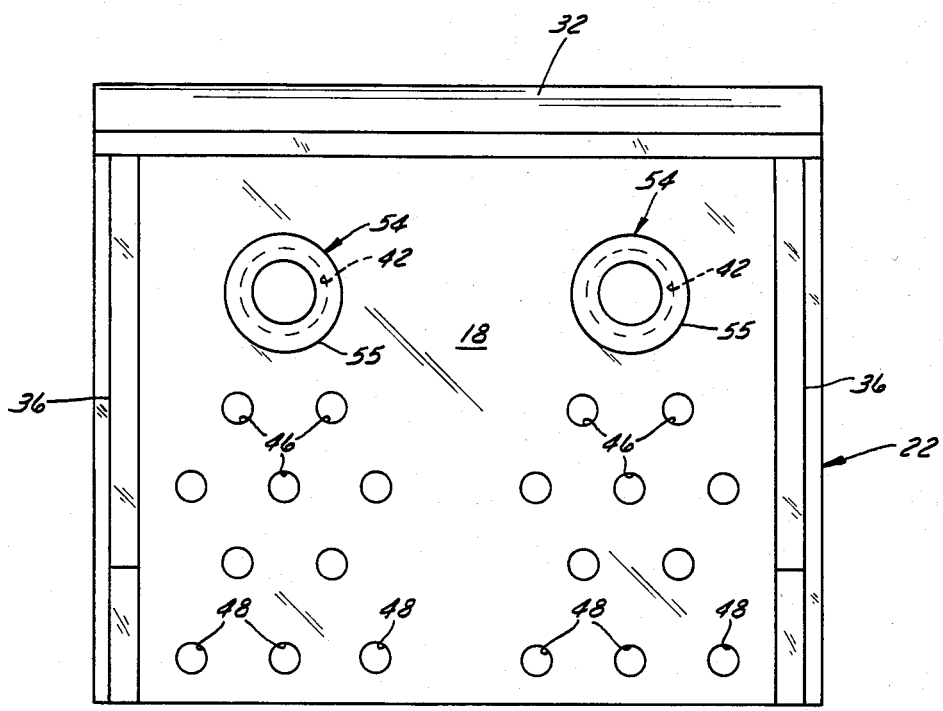
FIG. 7 is a top view of a second embodiment of outer plate 22.

FIG. 7 is a top view of a second embodiment of outer plate 22. In this figure, the hole pattern of FIG. 3 has been repeated to make a wider splice. The hole pattern could be repeated as many times as necessary in a solid plate to provide a splice for a wide belt, and the hole pattern of inner plate 26 would be made to correspond.

Alternatively, plates 22 and 26 as shown in FIGS. 3 and 5, respectively, could be used as modular units, placing several modular units side by side until the desired width is reached.

These figures are meant only as examples of the invention. It will be clear to one skilled in the art that many modifications could be made to these embodiments without departing from the scope of this invention.

What is claimed is:

1. A mechanical splice, comprising:
   first and second outer plates, each of said outer plates comprising:
     a flat portion having a length and an end and defining a plurality of non-collinear holes along said length, wherein said holes in said first outer plate correspond to said holes in said second outer plate;
     a curved portion extending from said end of said flat portion; and
     a brace connected to the curved portion and the flat portion of the outer plate and tending to stiffen the outer plate;
   first and second flanged bushings mounted in corresponding holes in said first and second outer plates near said end;
   an inner plate between said first and second outer plates, said inner plate having holes corresponding to the holes in said first and second outer plates;
   a spacer bushing mounted in the hole in said inner plate which corresponds to the holes in said outer plates in which said flanged bushings are mounted;
   a bolt placed through said first flanged bushing, through said spacer bushing, and through said second flanged bushing, wherein said bolt is tightened so as to push said flanged bushings into abutting end-to-end engagement with said spacer bushing, thereby pretensioning said bolt; and
   a plurality of pins, each pin extending through a corresponding hole in said first outer plate, said inner plate, and said second outer plate, the holes through which said pins extend being located more remotely from the end of the flat portion than the location of the holes in which the flanged bushings are mounted.

* * * * *